US006782990B2

(12) United States Patent
Joutsjoki et al.

(10) Patent No.: US 6,782,990 B2
(45) Date of Patent: Aug. 31, 2004

(54) METHOD AND APPARATUS FOR SORTING ROLLS

(75) Inventors: Jukka Joutsjoki, Järvenpää (FI);
Raimo Ruohio, Hämeenkoski (FI);
Pertti Ojala, Lahti (FI)

(73) Assignee: Metso Paper, Inc., Helsinki (FI)

( * ) Notice: Subject to any disclaimer, the term of this patent is extended or adjusted under 35 U.S.C. 154(b) by 41 days.

(21) Appl. No.: 10/332,017

(22) PCT Filed: Jun. 28, 2001

(86) PCT No.: PCT/FI01/00621

§ 371 (c)(1),
(2), (4) Date: Jan. 3, 2003

(87) PCT Pub. No.: WO02/02444

PCT Pub. Date: Jan. 10, 2002

(65) Prior Publication Data

US 2003/0152446 A1 Aug. 14, 2003

(30) Foreign Application Priority Data

Jul. 4, 2000 (FI) ............................................. 20001604

(51) Int. Cl.[7] ................................................ B65G 1/00
(52) U.S. Cl. ..................... 198/347.4; 198/435; 198/436; 198/606
(58) Field of Search ................................ 414/270, 272, 414/285; 198/347.4, 435, 436, 601, 606, 607

(56) References Cited

U.S. PATENT DOCUMENTS 3,358,831 A * 12/1967 Cothrell ...................... 209/606
3,734,264 A * 5/1973 Stumpf ...................... 198/347.4
5,085,377 A * 2/1992 Rohrer et al. ............. 242/559.3
5,533,861 A 7/1996 Klüpfel ..................... 414/794.2
6,609,605 B1 * 8/2003 Linder ...................... 198/347.1

FOREIGN PATENT DOCUMENTS

| EP | 0429 803 A1 | 6/1991 | ........... B65G/47/68 |
| EP | 0667 310 A1 | 8/1995 | ........... B65G/47/08 |

* cited by examiner

*Primary Examiner*—Christopher P. Ellis
*Assistant Examiner*—Mark A. Deuble
(74) *Attorney, Agent, or Firm*—Cohen, Pontani, Lieberman & Pavane

(57) ABSTRACT

A method and an assembly is disclosed for sorting rolls of paper and paperboard web for shipment into a desired sequence based on customer orders, in which method and assembly a roll to be sortedis imported to an infeed conveyor (2), and from at least two first conveyors (3, 4, 5) is selected a suitable conveyor onto which the roll is transferred. Subsequently, the roll is transferred onto the selected conveyor so that its leading end remains at the receiving end of said selected conveyor, and the rolls are transferred onto the first conveyors (3, 4, 5) in a similar fashion so that the rolls thus placed onto the conveyors remain in a close disposition to each other so as to form a group of end-to-end abutting rolls until at least one of the first conveyors contains a roll group forming a unit load for an upender lift. Next, the rolls are transferred onto a second conveyor (6, 7, 8 or 9), and finally the rolls are removed from the system onto an outfeed conveyor (9) as roll groups forming a unit load for an upender lift so that the roll groups are taken off from the sequence of rolls resting on the conveyor being unloaded at the interface between the conveyor (6, 7, 8) being unloaded and the successive unloading conveyor (10).

12 Claims, 4 Drawing Sheets

METHOD AND APPARATUS FOR SORTING ROLLS

PRIORITY CLAIM

This is a national stage of PCT application No. PCT/FI01/00621, filed on Jun. 28, 2001. Priority is claimed on that application and on Application No. 20001604, filed in Finland on Jul. 4, 2000.

BACKGROUND OF THE INVENTION

The invention relates to a method for sorting rolls of paper and paperboard web into a desired order ready for shipping according to customer orders.

The invention also relates to an assembly suitable for implementing the method.

In mills producing paper and paperboard, rolls ordered by customers are slit and wound to a desired width from a large machine roll at a slitter-winder. The customer rolls are slit from the machine roll so as to minimize the amount of waste. Inasmuch a given customer order cannot be fulfilled in all cases by slitting a single machine roll or the customer order may specify roll widths that cannot be slit in an evenly divisional manner from a roll, it is frequently necessary to slit a machine roll so that the slit rolls belong to different shipments. Hence, the slit rolls must be sorted latest before the rolls are to be delivered according to customer orders to their appropriate shipment lots. Such a need for sorting and regrouping of rolls arises due to, e.g., different roll sizes, shipping routes and customers. The sorting system must have a sufficient capacity and extensibility to cope with variations in customer orders and changes in grades produced. The system must be able to handle flexibly and rapidly all produced rolls inasmuch the manufacture runs continuously and the mill cannot be designed to have a large intermediate storage to buffer all the capacity of the different production steps at a mill. Furthermore, the system must offer gentle handling of the rolls to avoid causing damage thereto, and bulk shipping systems of rolls have to offer fast storage and unloading of a desired set of rolls. Typically, the footprint allocated for roll handling systems is very limited in a mill. The space available in existing buildings is predetermined, and the cost of a cubic meter unit volume in new buildings dictates the feasible size of the building and, thus, the available space.

Conventionally, the papermaking industry has accomplished the handling of rolls generally by means of sorting ramps and different kinds of high-bay rack storage systems, normally of the automated kind. Of these systems, high-bay racks offer the largest capacity. The sorting ramp comprises a slanted surface along which rolls are rolled downward. Flush with the surface of the ramp are adapted stops, generally in plural rows. The stops can be elevated up from the ramp at desired points, whereby a roll that is rolling toward the stop can be halted at a desired point. Conventionally, the lower end of the ramp terminates at a conveyor that takes the sorted rolls forward in the system. Sorting takes place so that, e.g., a set of rolls received from a slitter-winder is pushed to roll downward along the ramp and rolls belonging to a given shipment are halted by the stops. Arranging the stops in plural rows gives the possibility of dividing rolls slit from a single machine roll into several groups and, further, of combining rolls slit from different machine rolls with rolls slit from other machine rolls. After halting onto the slanted surface of the ramp all the rolls belonging to a given shipment, the rolls can be released, whereby they roll down onto the conveyor located at the lower end of the ramp. Usually, a ramp type sorting system is used for collecting rolls into groups to be transferred by a lift truck to packaging or, possibly, for altering the mutual order of rolls during or prior to their packaging. Ramp systems have also been used for collecting rolls into trailer loads, but herein some capacity problems have been encountered. The capacity of a ramp system is dependent on the number of ramps, and the largest systems can accommodate 200 to 250 rolls at a time. In addition to its limited capacity, a ramp system has been hampered by the risk of damage to the rolls from their rolling and stopping, not to mention the need for a large footprint Rack storages are used for combining trailer loads, as intermediate storages and as shipping storages. They are characterized by a large handling and storage capacity, as well as good flexibility. Rack storages fall in two major categories, wherein one type of rack storage provides an individual shelf for each roll, while the other type of rack storage has the rolls stored in groups that are stored horizontally along a store lane. The type of rack storage having one shelf reserved for each roll offers a maximized flexibility inasmuch each roll can be picked up individually from the storage.

On the other hand, efficient management of the storage needs fast roll-handling equipment and multiple infeed/fetch systems of rolls thus making the cost of the great capacity and flexibility high, whereby the use of this kind of storage is justified only when a relatively high capacity is requested. The average count of rolls in a storage designed for handling rolls individually may be 3000 rolls, while the infeed capacity is about 160 rolls/h and the fetch capacity about 240 rolls/h. If the rolls are grouped in the storage tightly against each other, the footprint of the storage may be reduced with the penalty of losing the possibility of individual roll handling.

SUMMARY OF THE INVENTION

It is an object of the present invention to provide a sorting/storage system featuring a capacity greater than that of a ramp system, a handling technique of rolls with a minimized risk of damage to rolls and a small footprint.

The goal of the invention is achieved by way of sorting incoming rolls with the help of an infeed conveyor onto at least two receiving conveyors into a desired order, whereupon during the transfer of the rolls to the receiving conveyor, the rolls thus sorted into the desired order are grouped into an end-to-end abutting batch with each other. After each receiving conveyor has become full so that it contains a fill number of rolls forming a predetermined unit load for an upender lift, the rolls can be unloaded from the receiving conveyor as unit loads of the upender lift.

According to an embodiment of the invention, after the receiving conveyor is full of rolls, all the rolls resting on the conveyor are transferred as an end-to-end abutting group onto a storage conveyor that is placed as an extension of the receiving conveyor.

According to another embodiment of the invention, the number of parallel-operating infeed and receiving conveyors is three of each and two or more conveyor groups are arranged to operate above one another.

The invention offers significant benefits.

The system comprises standard equipment, which makes its design, construction and even retrofitting easy to implement. The rolls are handled only in their longitudinal direction by moving them on conveyors thus avoiding the risk of damage to the rolls that may occur from their rotational movement and bumps during roll transfer. The system is extremely compact and can be fitted on a footprint smaller than that required by a ramp system of equivalent roll handling capacity. Furthermore, the system makes it possible to utilize the storage space also in the vertical dimension, whereby the storage capacity per square meter of the building floor area is maximized. The system capacity is higher than that achievable in a ramp system and it is readily controllable. If the system is required to provide a large storage capacity, it can be complemented with a required number of conveyors acting as buffer storage means.

BRIEF DESCRIPTION OF THE DRAWINGS

In the following, the invention will be examined in greater detail with the help of exemplary embodiments by way of making reference to the appended drawings in which.

DETAILED DESCRIPTION OF THE PRESENTLY PREFERRED EMBODIMENTS

Figure 1:
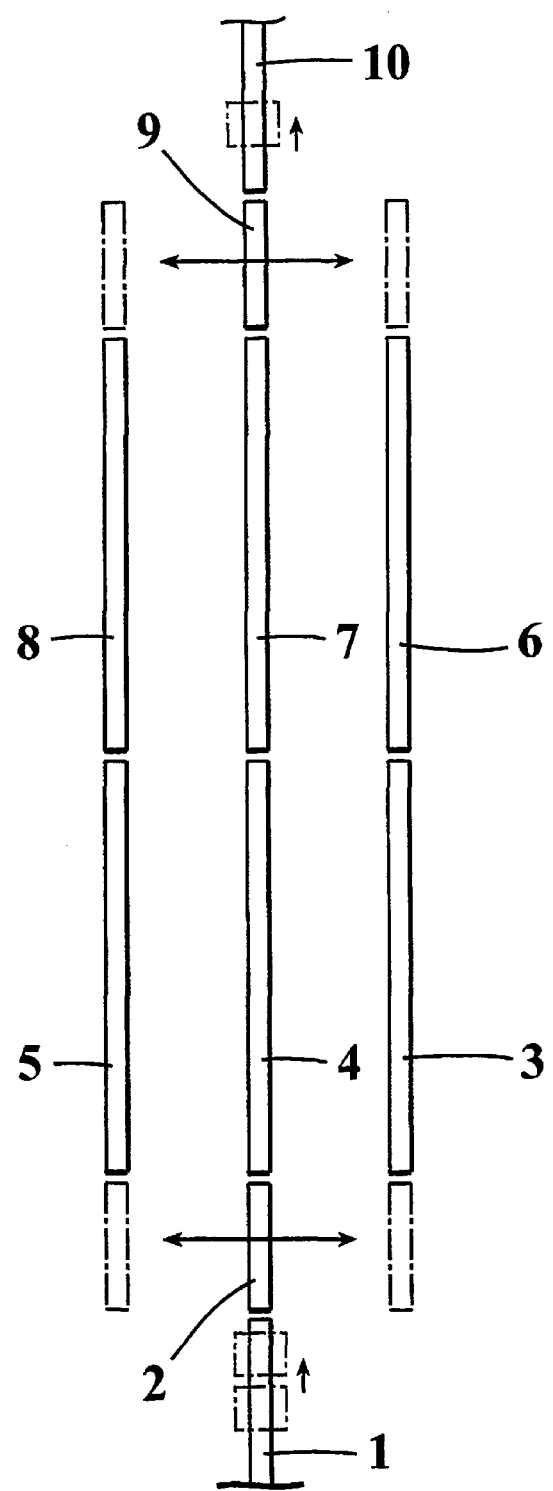
FIG. 1 shows a diagrammatic view of a first embodiment of the invention.

In FIG. 1 is shown a top view of the layout of a system according to the invention. First unit in the diagram is an importing conveyor 1 that is not a part of the system and the next unit is an infeed conveyor 2 adapted movable at least in its lateral direction. To the delivery end of the infeed conveyor 2 are adapted at least three receiving conveyors 3, 4, 5, followed by three storage conveyors 6, 7, 8. At the delivery end of the storage conveyors 6, 7, 8 is arranged an outfeed conveyor 9 similar to the above-mentioned infeed conveyor 2 and adapted at its delivery end to cooperate with a conveyor 10 that is not part of the system and merely serves to move the sorted rolls to an upender lift, for instance. In this lid of exemplary embodiment of the system, there is always a successively operating pair of conveyors formed by an outfeed conveyor with a receiving conveyor, but also intermediate conveyors therebetween can be used if necessary to increase the storage capacity of the system. The number of thus pairwise cooperating conveyors must be at least two in the embodiment described herein.

The function of the system comprises transferring a new roll to be introduced into the system by an import conveyor 1 to an infeed conveyor 2 that next moves the roll to that point along the length of receiving conveyor 3, 4, 5 at which the new roll is to be included into the roll group being collected. The new roll is subsequently shifted onto the receiving conveyor 3, 4, 5 and left at the end of the conveyor so that the next new roll to be received onto the receiving conveyor 3, 4, 5 can be fed by means of the infeed conveyor 2 against the end of the preceding new roll thus forming an end-to-end abutting group of rolls. By way of transferring the rolls in this end-to-end abutting fashion, the rolls occupy the smallest space possible. To minimize the storage space required by the rolls, the space between the roll ends is advantageously made as small as possible, however, with the provision that a small gap between the roll ends may be left to ease the separation of roll groups from each other, for instance. After the receiving conveyor becomes loaded to its full capacity, i.e., with a given number of roll groups each forming a unit load for the upender lift, the receiving conveyor 3, 4, 5 is emptied by transferring the rolls accumulated thereon onto a storage conveyor 6, 7, 8. From the storage conveyor 6, 7, 8, the rolls are moved onto an outfeed conveyor 9 so that the outfeed conveyor 9 always receives a given number of rolls that forms a unit load for the upender lift. Accordingly, the separation of the rolls transferred onto the storage conveyor is performed at the conveyor interface between the storage conveyor 6, 7, 8 and the outfeed conveyor 9.

Figure 2:
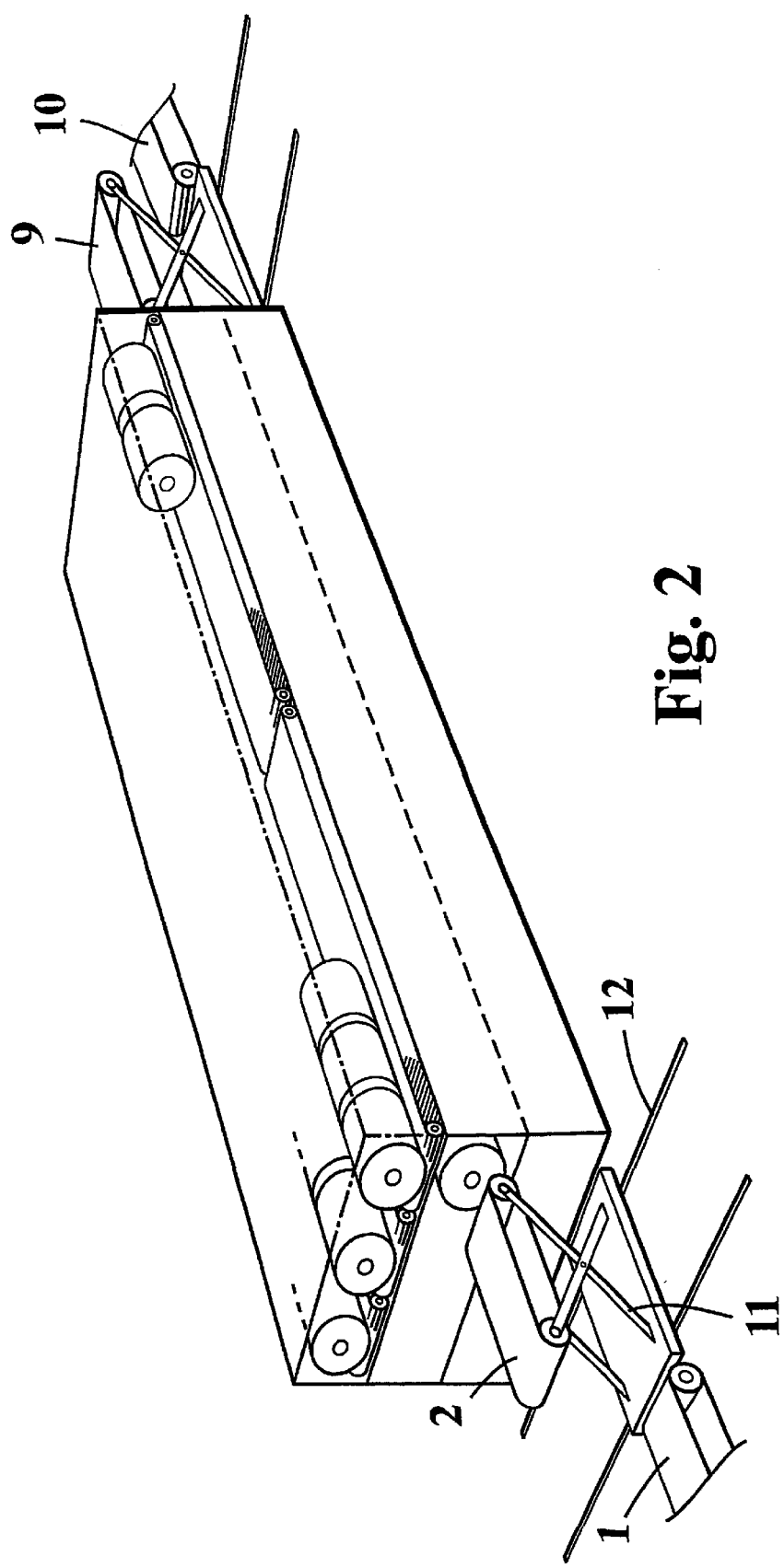
FIG. 2 shows a diagrammatic view of a second embodiment of the invention.

In the embodiment shown in FIG. 2, the system comprises three conveyor pairs adapted to operate in parallel in an arrangement having three conveyor groups adapted above one another. The length of such a conveyor assembly is typically, e.g., 15+15 m, while the width on each side is 6 m. By way of using a greater number of conveyor pairs, the sorting of rolls takes place more flexibly so that in the illustrated embodiment, for instance, each incoming roll has nine alternative sorting locations. The infeed conveyor 2 and the auxiliary conveyor 10 are adapted to operate on a scissors lift table running on rails 12. The lateral movement of these conveyors 2, 10 takes place on the rails 12, while their vertical movement is arranged by means of the scissors lift table 11, whereby a single infeed conveyor provides a sufficient capacity to deliver the rolls to each storage conveyor. The import conveyor 1 operates in a stationary position, thus allowing the rolls to be fetched from a single location. Advantageously, the delivery end of the import conveyor 1 is aligned at the central storage conveyor, whereby the interconveyor transfer distances are minimized. Obviously, the same design rules apply to the auxiliary conveyor 10 that takes away rolls from the system.

Figure 3:
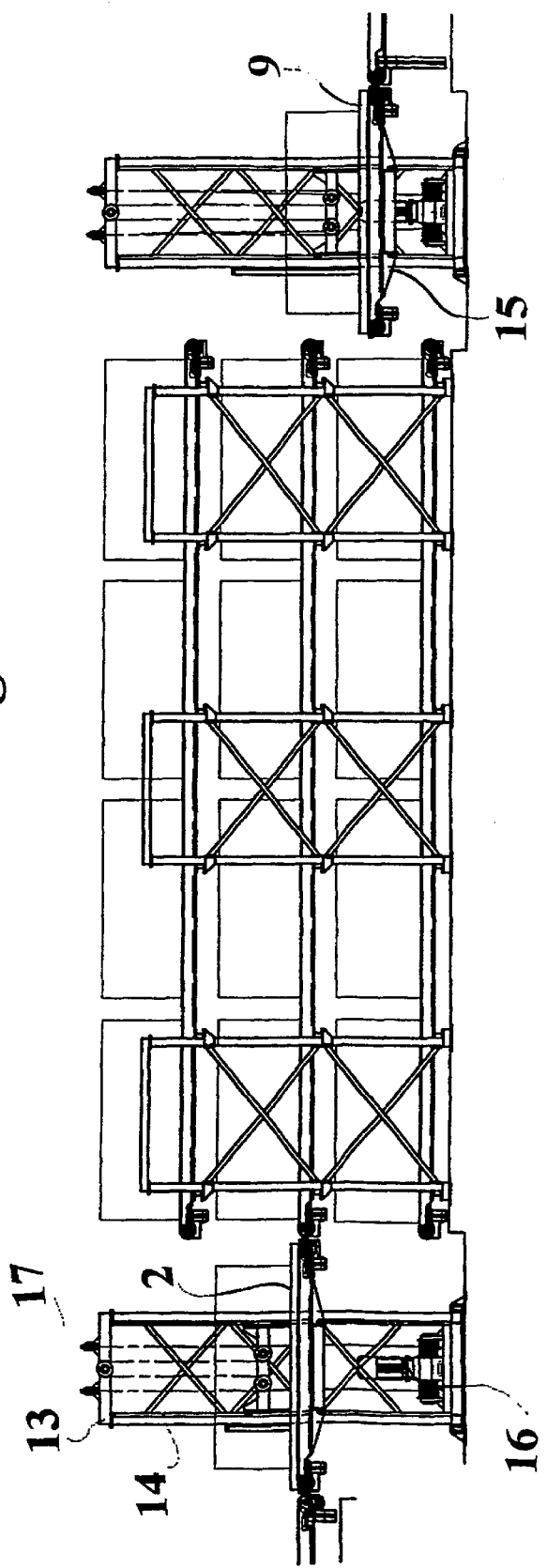
FIG. 3 shows a diagrammatic side elevation view of a third embodiment of the invention.
Figure 4:
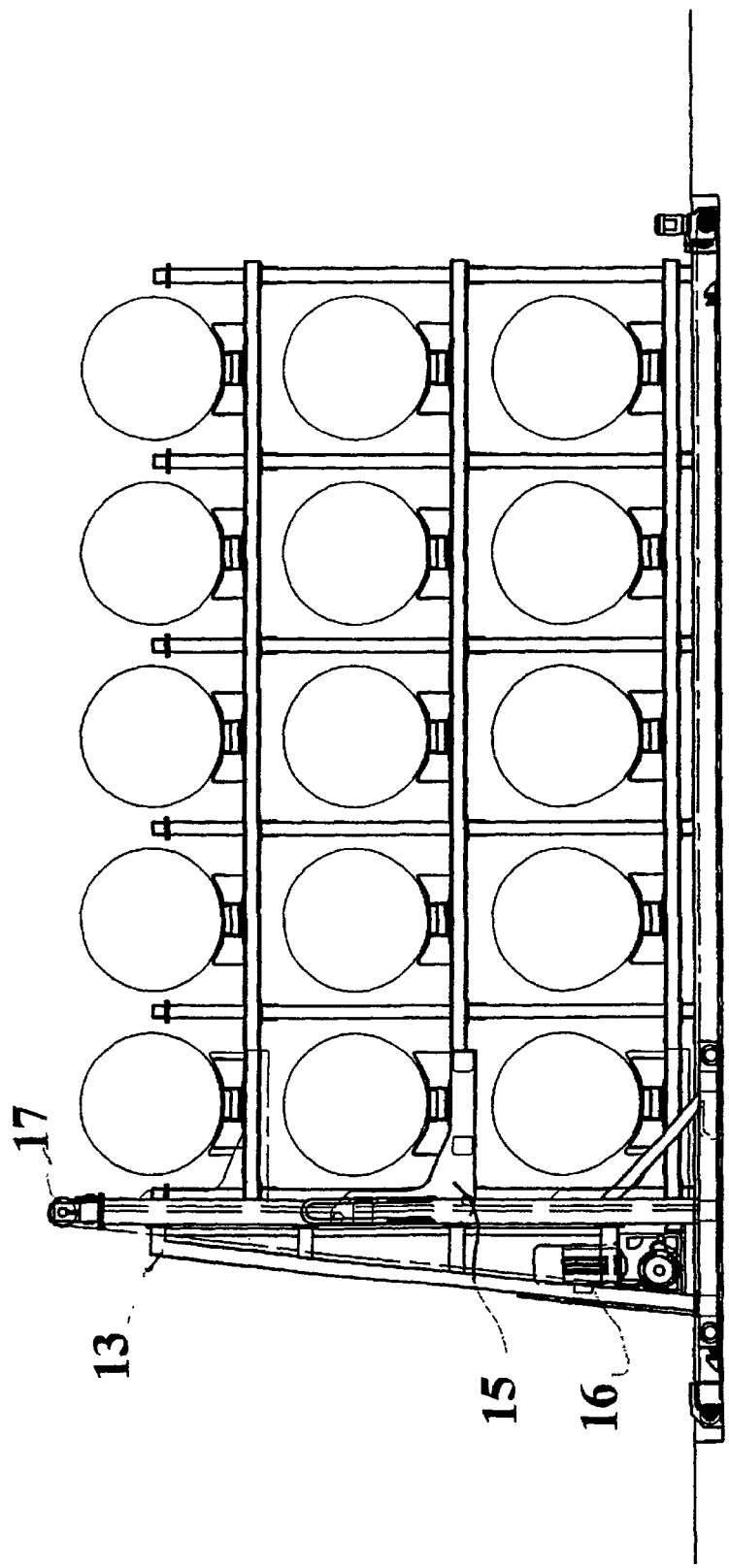
FIG. 4 shows an end elevation view of the embodiment of FIG. 3.

In the embodiments shown in FIGS. 3 and 4, the storage conveyors are omitted, whereby the system consists of the infeed conveyors only. The length of conveyors used in this arrangement is dictated by the required capacity. If the rolls are taken away by means of lift trucks from the conveyor system after the upender lift, a large storage capacity may not necessarily be needed. Herein, the rolls must then be transferred directly into a separate buffer storage or loaded into transport means for shipping to customers. In the case that a larger buffer or sorting capacity is required for loading of trailers or transport in bulk shipping units, the length of the conveyors may be increased. While the sorting operation in this embodiment takes place in the same fashion as described above, the omission of the transfer step between the infeed conveyor and the storage conveyor causes that the delivery of rolls from the conveyors and loading thereof cannot operate independently from each other. However, this is no major problem inasmuch plural conveyors are operated parallel to each other, whereby one conveyor can be unloaded at the same time the other parallel conveyors are being loaded. After one shipment lot has been sorted ready, those conveyors can be unloaded onto which the ordered lot of rolls has been collected, while empty or partially loaded conveyors are being loaded at the same time. In this embodiment, one advantageous arrangement is to design the capacity of the conveyors such that any one conveyor can receive a fall shipment lot at a time. The use of such a single-conveyor approach reduces the number of system components and makes maintenance easier.

The equipment layout shown in FIGS. 3 and 4 differs from the above-described embodiment also by its transfer system as to the infeed and outfeed conveyors 2, 9. In this embodiment, the conveyors are adapted onto a lift tower 13 equipped with guide rails 14 on the side of the tower 13 and a lift carriage 15 on which the conveyor operates movably.

The lift carriage 15 is moved vertically by means of a drive motor 16 and a chain transmission train 17. This type of elevation technique is commonly used in lift trucks, for instance. Also in this implementation, the lateral movement takes place along rails 12.

Without departing from the spirit and scope of the invention, also embodiments different from those described above may be contemplated.

As noted above, the number of conveyor pairs can be modified flexibly and without constraints. If the number of conveyor pairs tends to become excessive, it may be advantageous to use two or more infeed and receiving conveyors so that the operation of the system will not be impeded by long transfer distances. The movements of the infeed and receiving conveyors can be realized in plural ways, e.g., by means of a hoist movable along an overhead support rail. A person versed in the art of conveyor systems can without problem design a suitable mechanism capable of implementing the required movements optimally in each application of the invention. In principle, the system can utilize any type of conveyor, whereby the design of the conveyor construction must obviously be based on minimizing handling damage to the rolls.

What is claimed is:

1. Method for sorting rolls of paper and paperboard for shipment into a desired sequence based on customer orders, characterized in that the method comprises the steps of importing a roll to be sorted to an infeed conveyor (2), selecting from at least two first conveyors (3, 4, 5) a conveyor onto which the roll is to be transferred, transferring the roll onto the selected conveyor so that its leading end remains at the receiving end of said selected conveyor, transferring rolls onto said first conveyors (3, 4, 5) in a similar fashion so that the rolls thus placed onto the conveyors remain in a close disposition to each other so as to form a group of end-to-end abutting rolls until at least one of said first conveyors contains a roll group forming a unit load for an upender lift, transferring the rolls onto a second conveyor (6, 7, 8 or 9), and removing the rolls from the system onto an outfeed conveyor (9) as roll groups forming a unit load for an upender lift so that the roll groups are taken off from the sequence of rolls resting on the conveyor being unloaded at the interface between said conveyor (6, 7, 8) being unloaded and the successive unloading conveyor (10).

2. Method according to claim 1, characterized in that the sequence of rolls forming at least one unit load for said upender lift and resting on said first conveyor, called a receiving conveyor; is transferred in a continuously performed transfer step to a storage conveyor (6, 7, 8) which forms an extension to said receiving conveyor and from which conveyor the sequence of rolls can be further unloaded.

3. Assembly for sorting rolls of paper and paperboard web for shipment into a desired sequence based on customer orders, the assembly comprising at least one infeed conveyor (10), conveyors (5, 6, 7) for receiving rolls to be sorted, and, at least one outfeed conveyor (9), whereon rolls can be unloaded from said assembly, characterized by at least two first conveyors (3, 4, 5) for receiving rolls, means for moving at least one of said infeed conveyors (2) so as to coincide with a desired one of said first conveyors (3, 4, 5), and means for moving at least one of said outfeed conveyors (9) so as to make it coincide with a desired one of conveyors to be unloaded.

4. Assembly according to claim 3, characterized by at least two conveyor pairs comprising a receiving conveyor (3, 4, 5) and a storage conveyor (6, 7, 8) adapted to operate as an extension of the former.

5. Assembly according to claim 4, characterized in that the length of said storage conveyors (6, 7, 8) and said receiving conveyors (3, 4, 5) is at least equal to the maximum length of a unit load or a multiple thereof to be moved by an upender lift.

6. Assembly according to claim 4, characterized in that at least some of the first conveyors or conveyor pairs are adapted to operate in parallel with each other.

7. Assembly according to claim 4, characterized in that at least some of the first conveyors or conveyor pairs are adapted to operate superposed on one another.

8. Assembly according to claim 4, characterized in that the first conveyors or conveyor pairs are adapted to operate both in parallel with each other and superposed above one another.

9. Assembly according to claim 3, characterized in that the length of said first conveyors (3, 4, 5,) is at least equal to the maximum length of a unit load or a multiple thereof to be moved by an upender lift.

10. Assembly according to claim 3, characterized in that at least some of the first conveyors or conveyor pairs are adapted to operate in parallel with each other.

11. Assembly according to claim 3, characterized in that at least some of the first conveyors or conveyor pairs are adapted to operate superposed on one another.

12. Assembly according to claim 3, characterized in that the first conveyors or conveyor pairs are adapted to operate both in parallel with each other and superposed above one another.

* * * * *